United States Patent [19]
Cronin et al.

[11] 3,767,840
[45] Oct. 23, 1973

[54] NON-METALLIC CORONA SHIELD FOR GAS-INSULATED ELECTRICAL EQUIPMENT AND THE LIKE

[75] Inventors: John C. Cronin; John J. Depcrymski, both of Greensburg, Pa.

[73] Assignee: I-T-E Imperial Corporation, Philadelphia, Pa.

[22] Filed: Sept. 8, 1972

[21] Appl. No.: 278,793

[52] U.S. Cl.............. 174/73 R, 174/13, 174/21 C
[51] Int. Cl............................................. H02g 15/24
[58] Field of Search................ 174/13, 21 R, 21 JS, 174/21 C, 21 CA, 22 C, 28, 73 R, 73 SC, 99 E, 127; 339/143 R, 143 C

[56] References Cited
UNITED STATES PATENTS

| | | | |
|---|---|---|---|
| 1,779,416 | 10/1930 | Austin | 174/73 SC UX |
| 3,323,097 | 5/1967 | Tordoff | 174/73 R X |
| 3,356,785 | 12/1967 | Yoshida et al. | 174/127 X |
| 3,509,518 | 4/1970 | Phillips | 174/73 R UX |
| 3,522,362 | 7/1970 | Bahen, Jr. et al. | 174/99 E UX |
| 3,548,071 | 12/1970 | Bahen, Jr. et al. | 174/28 X |
| 3,571,783 | 3/1971 | Lusk | 174/21 R X |
| 3,573,341 | 4/1971 | Graybill et al. | 174/22 C |
| 3,585,271 | 6/1971 | Reynolds et al. | 174/21 CA X |
| 3,622,688 | 11/1971 | Link et al. | 174/73 R X |
| 3,691,291 | 9/1972 | Taj | 174/73 R |

FOREIGN PATENTS OR APPLICATIONS
1,159,205  7/1969  Great Britain .................. 174/73 R

*Primary Examiner*—Laramie E. Askin
*Attorney*—Ostrolenk, Faber, Gerb & Soffen

[57] ABSTRACT

A corona shield for use in isolated phase bus structure comprised of a central conductor and a concentrically arranged surrounded grounded housing. To electrically join adjacent sections of such isolated phase bus, the inner conductors are arranged in end-to-end fashion with suitable expansion joint structures between adjacent sections. A corona shield is provided in the region surrounding the expansion joint to reduce local stress concentration and thereby provide enhanced dielectric shielding. The corona shield is formed of a suitable dielectric (i.e., insulating) material coated with a suitable conductive material along its interior surface so as to electrically engage the end portion of one of the two conductor sections arranged end-to-end while being electrically insulated from the end of the remaining adjacent conductive portion. This arrangement provides for relative linear movement of the adjacent inner conductors due to thermal expansion and contraction while preventing the generation of particles due to metal-to-metal contact and consequent abrasion therebetween so as to greatly reduce the probability of flashover.

By increasing the conductivity of the conductive coating in the immediate region of the corona shield and the relatively movable inner conductor, current flow therebetween is eliminated.

3 Claims, 1 Drawing Figure

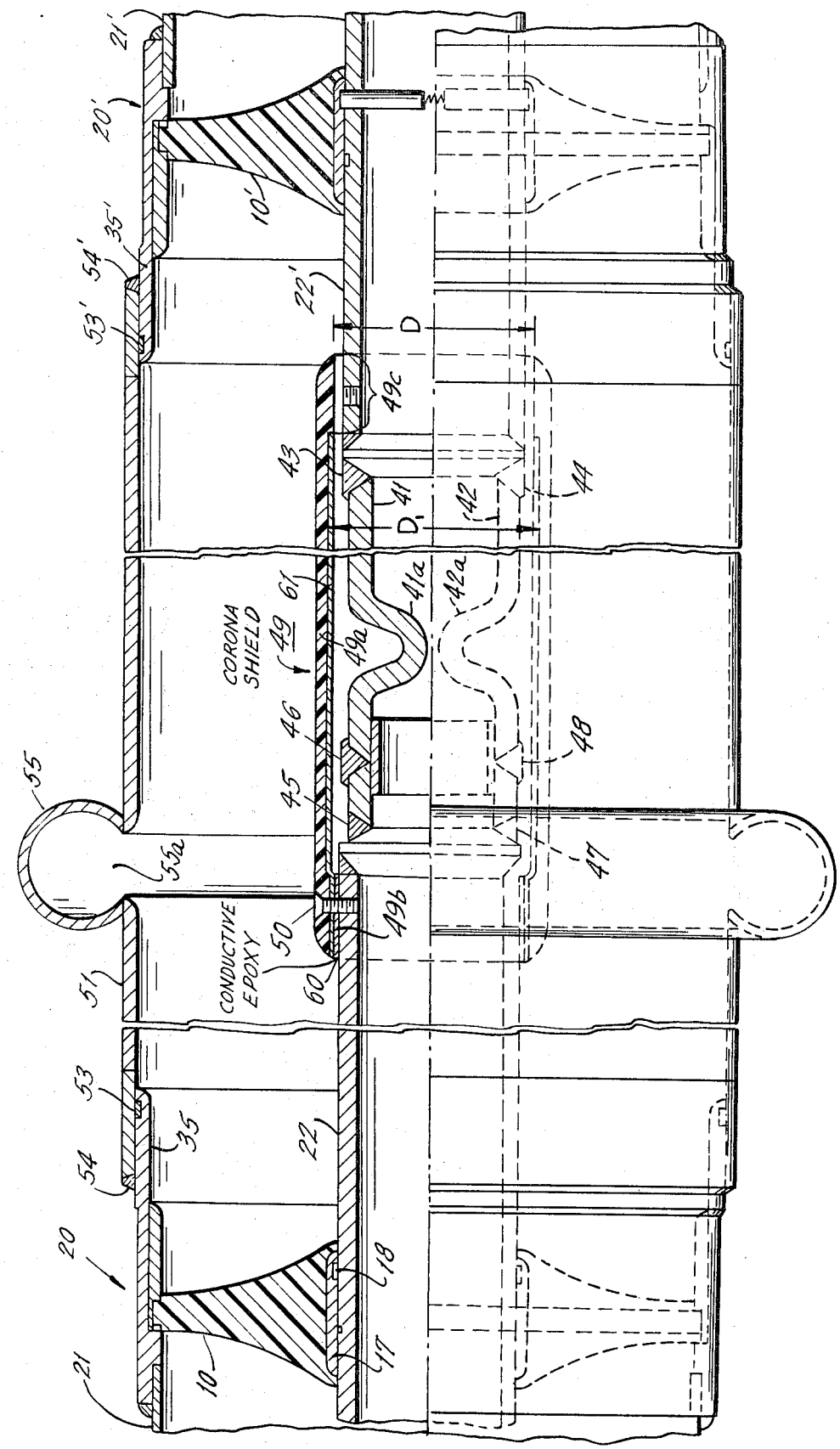

NON-METALLIC CORONA SHIELD FOR GAS-INSULATED ELECTRICAL EQUIPMENT AND THE LIKE

The present invention relates to isolated phase bus transmission systems and more particularly to a novel corona shield for use in such systems particularly of the pressurized-gas-insulated type which is treated with a conductive coating or paint to relieve and reduce dielectric stress in the region of inner conductors which are connected end-to-end and permitted to move relative to one another to allow for thermal expansion and/or contraction.

BACKGROUND OF THE INVENTION

Typical pressurized-gas-insulated transmission systems consist of a cylindrical or tubular shaped inner conductor supported coaxially within a grounded conductive enclosure also of cylindrical shape. The inner conductor is maintained at a high voltage while the housing is grounded. Generally electrical stresses between the conductive surfaces are very high and considerable attention must be given to keeping all confronting surfaces as smooth as possible to avoid or preferably eliminate local stress concentrations which conventionally occur at sharp points or edges.

Bus runs are typically comprised of a plurality of bus sections arranged end-to-end whereby the inner conductors are electrically and mechanically joined to one another, as are the outer grounded conductive housings. Due to the large temperature swings encountered during operation, expansion assemblies must be provided to allow for thermal expansion and/or contraction of the bus sections relative to one another. One suitable expansion joint assembly for joining inner conductors is described in copending application Ser. No. 137,322 filed Apr. 26, 1971 now U.S. Pat. No. 3,713,075 issued Jan. 23, 1973 and assigned to the assignee of the present invention. The assembly described therein utilizes a hollow cylindrical-shaped aluminum sleeve which substantially surrounds the expansion joint assembly, which sleeve is provided with large radius edges to control dielectric stress. This requires the use of a relatively thick shield which further reduces the clearance between the shield and the interior surface of the surrounded housing in the vicinity of the expansion joint. The sleeve also requires a considerable amount of machining for fabrication thereof.

BRIEF DESCRIPTION OF THE PRESENT INVENTION

The present invention is characterized by providing a suitable dielectric shielding structure which is simpler to fabricate and consequently cheaper in cost of material and assembly and which provides excellent dielectric shielding as compared with conventional techniques.

The present invention is comprised of a substantially cylindrical-shaped shield formed of a suitable dielectric or insulating material having a portion of its interior surface coated with a suitable conductive material such as conductive paint except for a marginal portion thereof which is adapted to overlie one of the two central conductors arranged in end-to-end fashion. At least a portion of the interior surface of the insulating shield is of increased interior diameter immediately adjacent the uncoated portion thereof with the conductive paint terminating at this point. The corona sleeve telescopingly receives the adjacent ends of the inner conductors which are joined by a suitable expansion joint assembly. One end of the corona shield bearing the conductive coating is preferably secured to one end of one of said conductors so that the conducting paint makes electrical contact therewith and so that the corona shield is fixedly secured thereto. The opposite end of the shield, whose marginal inner portion is free of any conducting paint, slidably receives the end of the remaining inner conductor whose uncoated section is of reduced diameter so as to provide for sliding engagement between the un-coated interior surface portion of the corona shield and the remaining conductor whereby any abrasion therebetween will not create or generate metallic particles. This structure was found to be at least equal and in most cases superior in relieving dielectric stress as compared with metallic corona shields.

It is therefore one object of the present invention to provide a novel corona shield formed of a suitable insulating material for/use in telescopingly receiving the adjacent ends of the inner conductors of an isolated phase bus system, which corona shield is coated with a conducting paint on at least a portion of its interior surface so as to electrically engage one of the inner conductors which it telescopingly receives while being free to make sliding engagement with the end of the remaining conductor which it telescopingly receives with the portion of the corona shield slidably receiving the end of the remaining conductor being free of any conducting paint to prevent the generation of any electrical particles due to the sliding contact and to provide a high impedance path for any attempted transfer of current between the conductive coating of the corona shield and the remaining conductor.

BRIEF DESCRIPTION OF THE FIGURE

The above as well as other objects of the present invention will become apparent when reading the accompanying description and drawing in which the FIGURE shows a cross-sectional view of an isolated phase bus structure employing our novel corona shield.

DETAILED DESCRIPTION OF THE DRAWING

The sole FIGURE shows a corona shield 49 for use with compressed-gas-insulated-electrical isolated phase bus and in the region between two adjacent sections 20 and 20', each section being comprised of a tubular central conductor 22 and 22' positioned within openings provided in insulating spacers 10 and 10' whose outer peripheries engage grounded conductive housings 21 and 21' to maintain the grounded conductive housings in concentric alignment with their associated tubular inner conductors 22 and 22', respectively. A cover assembly comprised of a telescoping housing section 51 telescopingly receives the free end of housings 21 and 21' in the manner shown. To allow for proper expansion and contraction of the enclosures 21 and 21' due to temperature swings during operation, an intermediate portion of the telescoping cover 51 is provided with a toroidal-shaped enclosure section 55 which is partially opened at 55a and joined at its opening edges to slide cover 51. The weldments 54 and 54' electrically join and air-tightly seal the telescoping cover to the housing portions 21 and 21'. Gaskets 53 and 53' serve to prevent any contaminating materials from entering into the hollow interior region of the joined bus section during the welding operation.

The inner conductors 22 and 22' are electrically and mechanically joined by a flexible conductor assembly comprised of a pair of spaced parallel flexible conductor members 41 and 42 secured at their right-hand ends to the left-hand end of tubular conductor 22' in any suitable manner such as, for example, by welding, which weldments are shown at 43 and 44, respectively. Tubular conductor 22 extends a greater distance beyond its duct cover end 35 and tubular conductor 22' extends beyond its duct cover end 35'. The left-hand ends of flexible conductive members 41 and 42 are coupled to the right-hand end of conductor 22 such as, for example, by welding at the locations indicated by weldments 45, 46, 47 and 48. Bent portions 41a and 42a of the flexible conductive members are provided for the purpose of allowing for elongation or contraction of these conductors, as well as conductors 22 and 22'.

The structure described hereinabove is set forth in detail in U.S. Pat. No. 3,573,341, assigned to the assignee of the present invention. This patent is incorporated herein by reference thereto.

The corona shield 49 employed in the structure shown in the FIGURE serves to relieve dielectric stress in the region of the electrical expansion joint assembly and to cover any sharp points or edges which may exist in the structure, at which stress points would normally be developed.

The left-hand end of corona shield 49 is bonded to the right-hand end of conductor 22, preferably with a suitable conducting epoxy, as shown at 60. Alternatively, or in addition thereto, insulating set screws 50 may be utilized to draw the interior surface of corona shield 49 against the exterior surface of conductor 22 to provide good electrical contact between the conductive coating 61 and conductor 22.

The corona shield 49 is preferably formed of a suitably high dielectric insulating material. In one test, the dielectric corona shield was cast in a cycloaliphatic epoxy, although other materials may be employed having like insulating characteristics.

The central portion 49a of the interior surface of corona shield 49 is preferably of an enlarged diameter $D_1$ relative to its end portions 49b and 49c which have a diameter D slightly smaller than $D_1$. The interior surface of the corona shield is treated with a conductive material 61 such as, for example, a suitable conducting paint except for the interior region designated by numeral 49c. Since the end portion 49c telescopingly and slidably receives the left-hand end of conductor 22' and since portion 49c is of a reduced diameter relative to central portion 49a, any relative sliding movement between surface 49c and the left-hand end of conductor 22' prevents any sliding or abrasive engagement between the interior surface portion of the corona shield treated with the conducting paint and the exterior surface of the left-hand end of conductor 22'. This thereby prevents any metal-to-metal scraping which might otherwise generate particles whose presence would greatly enhance the dangerous flashover condition. By terminating the conducting paint well inside the right-hand most edge of corona shield 49, it is possible to keep the edge stresses low thereby further reducing the probability of flashover.

One of the problems which has been found to arise in the use of such corona shields is the existence of a current flow in the corona shield which causes conductor erosion when the current transfers back from the corona shield to the conductor at the sliding end (i.e., between corona shield 49 and conductor 22'). This problem can be eliminated by controlling the conductivity of the conducting paint 61 on the corona shield so as to provide a high impedance path for any attempt at transfer of current. For electrostatic shielding the conductivity does not have to be high, since virtually no current flow is involved, and a fairly high resistance coating can be used without in any way reducing the effectiveness of the shield.

In one experimental test, the corona shield was formed of a cycloaliphatic epoxy coated with a conducting paint having a resistance of 15 Ohms. This type of shield was tested simultaneously with the typical metallic corona shield and it was found that the reduction in dielectric stress was at least as good as and in many cases better than the dielectric shielding characteristics of the corona shield formed completely of a conductive material.

The basic advantage of an epoxy corona shield is that it is intrinsically a much better dielectric system than an all-metallic shield, that it reduces the probability of generating metallic particles due to sliding movement between the shield and at least one of the conductors and further that the casting of a dielectric shield of insulating material is significantly less expensive than the machining of an all-aluminum dielectric shield.

Conductive coatings which have been found to be suitable for use in the aforementioned corona shield are ECCO Bond 56C and Allied Products Corp. 3025-B.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. First and second electrical conductors and a corona shield for use in reducing the dielectric stresses in the region between said first and second conductors whose adjacent ends are joined by a flexible electrical coupling;
    said conductors being surrounded and enclosed within a concentrically arranged grounded conductive housing assembly, said shield comprising
    a cylindrical-shaped sleeve formed of an insulating material;
    said sleeve surrounding said coupling and telescopingly receiving the adjacent free ends of said conductors;
    a first portion of the interior surface of said sleeve being provided with a conductive material;
    at least a second portion of said sleeve being free of said conductive material and being adapted to make sliding engagement with said first conductor;
    said second portion being of reduced diameter relative to at least the immediately adjacent interior surface of said sleeve to prevent said conductive material from engaging said first conductor;
    means securing one end of said sleeve to said second conductor and providing electrical engagement between said conductive material and said second conductor.

2. The combination of claim 1 wherein said material is a conductive paint.

3. The combination of claim 1 wherein said means is a conductive epoxy.

* * * * *

UNITED STATES PATENT OFFICE
CERTIFICATE OF CORRECTION

Patent No. 3,767,840               Dated 23 October 1973

Inventor(s) John C. Cronin et al

It is certified that error appears in the above-identified patent and that said Letters Patent are hereby corrected as shown below:

On Title page, line 22, following filed please delete "Sept." and replace by ---August---

Signed and sealed this 21st day of January 1975.

(SEAL)
Attest:

McCOY M. GIBSON JR.　　　　　　　　　　C. MARSHALL DANN
Attesting Officer　　　　　　　　　　　Commissioner of Patents